United States Patent
Fletcher

(10) Patent No.: US 6,834,251 B1
(45) Date of Patent: Dec. 21, 2004

(54) METHODS AND DEVICES FOR IDENTIFYING, SENSING AND TRACKING OBJECTS OVER A SURFACE

(76) Inventor: Richard Fletcher, 432 Columbia St. #B13B, Cambridge, MA (US) 02141

( * ) Notice: Subject to any disclaimer, the term of this patent is extended or adjusted under 35 U.S.C. 154(b) by 76 days.

(21) Appl. No.: 10/012,218

(22) Filed: Dec. 6, 2001

(51) Int. Cl.$^7$ .................. G01C 17/00; G01C 19/00; G01C 9/00; G06F 15/00
(52) U.S. Cl. .................. 702/150; 314/326; 314/207; 314/5; 340/572; 340/360; 340/205; 340/572.1; 340/572.7; 343/850; 342/445; 318/685
(58) Field of Search .................. 702/150; 314/5, 314/326, 207; 340/572.1–572.7, 360, 205, 572; 342/445; 318/685; 343/850

(56) References Cited

U.S. PATENT DOCUMENTS

| | | | |
|---|---|---|---|
| 3,519,802 A | | 7/1970 | Cinque et al. |
| 3,878,367 A | | 4/1975 | Fayling et al. |
| 4,100,472 A | * | 7/1978 | Mobley ............ 318/685 |
| 4,219,821 A | * | 8/1980 | Selim ............ 342/445 |
| 4,672,562 A | | 6/1987 | Egli et al. |
| 5,386,219 A | | 1/1995 | Greanias et al. |
| 5,434,917 A | | 7/1995 | Naccache et al. |
| 5,828,770 A | | 10/1998 | Leis et al. |
| 5,955,879 A | * | 9/1999 | Durdle et al. ....... 324/207.17 |
| 5,992,601 A | | 11/1999 | Mennie et al. |
| 6,020,849 A | | 2/2000 | Fukuzaki |
| 6,084,513 A | * | 7/2000 | Stoffer ............ 340/572.2 |
| 6,084,545 A | * | 7/2000 | Lier et al. .......... 342/360 |
| 6,097,189 A | * | 8/2000 | Arndt et al. ......... 324/326 |
| 6,121,933 A | * | 9/2000 | Cosenza et al. .... 343/700 MS |
| 6,204,764 B1 | | 3/2001 | Maloney |
| 6,301,763 B1 | | 10/2001 | Pryor |
| 6,340,932 B1 | * | 1/2002 | Rodgers et al. ...... 340/572.7 |
| 6,359,597 B2 | * | 3/2002 | Haj-Yousef ......... 343/850 |
| 6,362,737 B1 | * | 3/2002 | Rodgers et al. ...... 340/572.1 |
| 2002/0057192 A1 | * | 5/2002 | Eagleson et al. ..... 340/305 |
| 2002/0062203 A1 | * | 5/2002 | Gilboa ............ 702/150 |
| 2002/0149483 A1 | * | 10/2002 | Shanks et al. ...... 340/572.1 |

* cited by examiner

*Primary Examiner*—John Barlow
*Assistant Examiner*—Aditya Bhat
(74) *Attorney, Agent, or Firm*—Testa, Hurwitz & Thibeault, LLP

(57) ABSTRACT

Methods and devices are disclosed for identifying objects over a surface and for tracking the position of said objects in relation to the sensing surface. The methods include the steps of providing an array of electrodes or coils that generating electromagnetic radiation having a individual characteristic frequencies of oscillation. Objects in proximity to the sensing surface(s) couple electromagnetically to the array of electrodes or coils, which then alters the characteristic frequency of one or more elements in the array. By monitoring the individual frequency shifts among the array elements, one or more objects in proximity to the surface can be sensed and identified. Quantitative identification and enhanced detection of the objects is achieved through the use of electromagnetic markers affixed or embedded in the objects in specified geometric patterns. In addition, a method is presented for scanning the sensing array, through the use of a second layer of electrodes that selectively mask or modulate the sensing field.

63 Claims, 15 Drawing Sheets

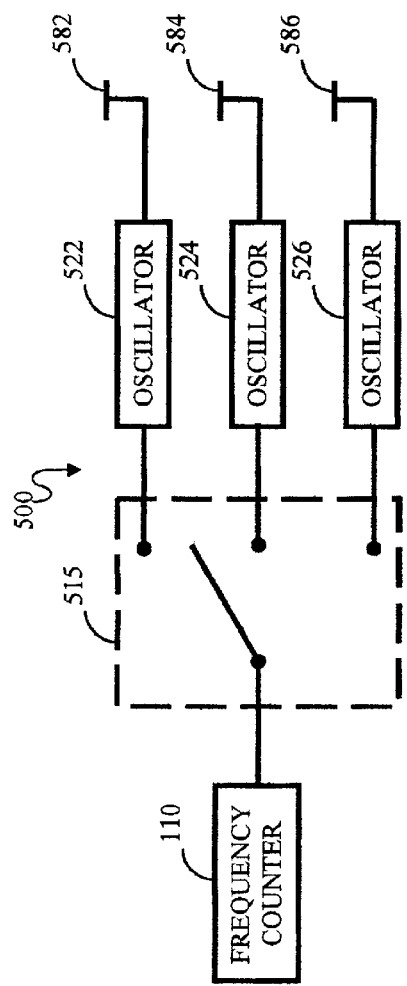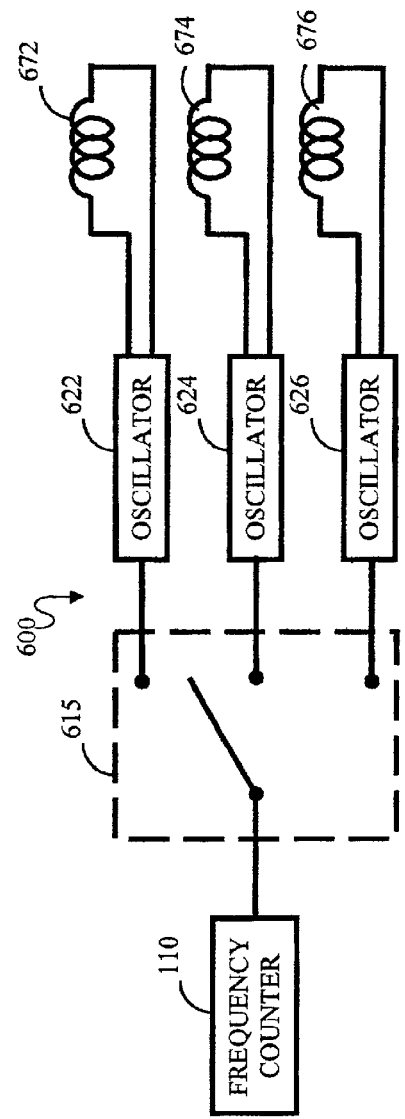

METHODS AND DEVICES FOR IDENTIFYING, SENSING AND TRACKING OBJECTS OVER A SURFACE

BACKGROUND OF THE INVENTION

1. Field of the Invention

The present invention generally relates to improvements in identifying, sensing, and tracking of objects in predefined spaces by electromagnetic means.

2. Background and Prior Art

There exists a great and increasing need to identify and to automatically detect the presence, orientation and movement of objects in a predefined area. Such objects can include a wide range of animate and inanimate things, such as people's hands, pill bottles, tools, packages, toys, and many more. The applications for such automatic object detection and identification are numerous, including detecting a person's activity over a work surface or interactive display; monitoring the inventory or theft of products on a retail store shelf; locating and aligning parts for robotic assembly in manufacture; and recreational games or toys relying upon placement and movement of objects, to name a few.

One common method of identifying and tracking objects employs a visible "tag" or target marking that is affixed to the desired object and uses a computer vision tracking system to monitor the object. U.S. Pat. Nos. 6,301,763, 5,828,770, and 4,672,562, incorporated herein by reference, disclose various machine vision methods for identifying and tracking the 3D movement of objects. While the low cost of such optical tags and markers is an attractive feature, the cost of the camera and vision system is not sufficiently low for many consumer applications. Additionally, vision-based systems require line-of-sight access between the visible marker and the detector, which is difficult to employ in non-controlled environments and lighting conditions, such as for home or retail applications.

Another method of detecting and tracking objects employs an "active" electronic tag affixed to the object, which contains circuitry for transmitting a radio frequency signal that can be used by the host unit to determine the object's identity, presence, orientation or movement. As an example, U.S. Pat. No. 6,204,764, incorporated herein by reference, discloses a method for identifying and tracking objects such as key cards and folders inside a filing cabinet drawers. Although radio-frequency tagging methods are robust and do not require line-of-sight, the expense of the electronic circuitry inside these tag makes this approach prohibitive for low-cost applications.

As a means of reducing cost, it is also possible to tag an object with an electromagnetically resonant structure, such as an "LC" resonator having an identifiable and detectable resonant frequency and Q factor. U.S. Pat. Nos. 6,020,849 and 5,386,219, incorporated herein by reference, provide a method for tracking such tagged objects over a surface using an electronic sensing array of coils or electrodes. This technology is commonly used in digitizing pen tablets and computer automated design (CAD) stylus input devices. While the electromagnetic tags employed in such systems are relatively low cost, the electronic switching circuitry and wiring required to multiplex the signals throughout the sensing array make these systems too costly for simple mass market products such as retail store displays, a home medicine cabinet shelf, or children's toys.

Other methods for identifying objects have also been invented in the field of anti-counterfeiting and authentication. U.S. Pat. Nos. 5,434,917 and 3,878,367, incorporated herein by reference, disclose methods for identifying and authenticating credit cards through the use of randomly dispersed embedded magnetic particles that are detected as the credit card is swiped past a specialized scanner. U.S. Pat. No. 3,519,802, incorporated herein by reference, describes a method for electromagnetically marking a credit card through the use of embedded conducting plates; detection circuitry for this invention is not described. U.S. Pat. No. 5,992,601, incorporated herein by reference, discloses an apparatus for identifying and sorting currency that has been tagged with specific patterns of magnetic ink. While such anti-counterfeiting and authentication technologies provide a rudimentary means of identifying objects, the detection means is generally limited to specialized scanning and sorting apparatus with fixed geometries, and not adaptable or scalable to surfaces such as table tops, desks, shelves, retail display fixtures, or game boards. Additionally, these inventions do not provide a means for tracking the position or orientation of objects over a surface.

SUMMARY OF THE INVENTION

The present invention provides a method of identifying objects over a surface and a means for determining the position and orientation of the specified objects with respect to the sensing surface. The present invention combines the low-cost advantage of using vision-based tags (e.g. barcodes) with the versatility and security of electronic tagging methods. Furthermore, the present invention can be easily implemented with a conventional manufacturing process, such as printing or attaching a label, and still achieve the ability to operate via non-optical means, such as through a table-top or through packaging material such as an envelope, plastic casing, or product label.

The present invention entails the use of a reference surface, comprised of an array of electrodes or coils generating electromagnetic radiation having a characteristic frequency of oscillation, typically in the range 1–50 MHz. The objects in proximity to the sensing surface couple electromagnetically to the array of electrodes and coils, which then alters the characteristic frequency of one or more elements in the array. The resulting frequency shifts are thus an indirect measure of the electromagnetic response of the object. By monitoring the individual frequency shifts among the array elements, one or more objects in proximity to the surface can be sensed.

Changes in the characteristic frequencies of the elements are measured using a threshold detector and frequency counter, both of which can be easily implemented using a low-cost microcontroller, for example. Although changes in the sensing field induced by the object can also be monitored by other standard methods, such as measuring changes in the amplitude or phase of the sensing voltage, the technique of frequency-counting is much more inexpensive, requiring a minimal number of electronic components.

For most applications of this invention, the area of each sensing element (electrode or coil) in the sensing array would typically be in the range of 0.1 square centimeters to 100 square centimeters. A densely-spaced array of small sensing elements provides better lateral resolution; however, larger sensing elements provide a greater detection distance, since they produce probing fields that extend a further distance perpendicular to the array surface. In a given application, a combination of large and small sensing elements can also be used.

In the first embodiment of the present invention, rudimentary identification and detection of each object is accomplished by noting the intrinsic electromagnetic response of the material comprising the object (for example, distinguishing between a plastic box, a metal box, or container of milk). The characteristic electromagnetic properties of the objects can be intrinsic to the object or can be engineered, such as through the use of electrically conductive, magnetic, or dielectric materials applied to the object.

More significantly, for the case of a plurality of objects having similar electromagnetic properties, such as a stack of magnetic-ink-coated paper, this embodiment enables the ability to estimate the quantity of objects present. This ability is particularly relevant for inventory-monitoring applications, such as counting the number of greeting cards in each pocket of a display rack, or counting the number of magazines in a vending machine row.

In a preferred embodiment of the present invention, a quantifiable method of object identification is further achieved through the use of electromagnetic markers, such as electrically conductive or magnetic patches, that can be either printed or embedded onto (or into) the object in a specific coded pattern. Given a known electromagnetic response and spatial distribution of the markers, the object can be uniquely identified and its 2D orientation ascertained. Using a large array with greater surface area, multiple objects can also be detected and identified simultaneously.

The present invention also provides a means for determining the lateral position of a specified object or objects. Given an electrode array that is larger than the size of the objects and/or electromagnetic marker pattern, the position of the object can be determined within a resolution limited by the density and number of electrodes in the array. In general, the sensing elements (electrodes or coils) should be closely spaced in order to increase lateral positioning resolution; however, each sensing element must be sufficiently large to adequately couple electromagnetically to the object over the surface.

The noted method also provides a means to determine the orientation of the object relative to the sensing surface. A non-rotationally symmetric 2-dimensional pattern of markers embedded in the surface of the object facing the sensing surface enables the system to determine the 2D orientation of the object. By affixing or embedding the aforementioned electromagnetic markers to all faces of the object's surface, such that each face is distinguishable from every other face, it then becomes possible to obtain a simple determination of the object's 3D orientation. By way of example, one application of this technique could be a system or method for determining the orientation of a die in a casino board game.

A further embodiment of the present invention involves the use of a second layer of electrodes that are used to modulate or mask-off portions of the electromagnetic field produced by the sensing array. This "modulation layer" thus enables the surface array of the array to be scanned electronically by activating or "unmasking" only one section of the sensing array at a time. Although it is possible to use a conventional approach to multiplex the radio frequency electronics to the sensing array, the cost of a multiplexer and switches for these radio frequency signals is prohibitive for low-cost applications. Therefore, the a motivation for the masking layer of the present invention is to the lower cost and complexity of the system by providing a means for a single set of radio-frequency electronics (oscillator, frequency counter) to selectively monitor each of the potentially large number of electrodes in the sensing array. In addition, careful control of masking enables the system to have an additional degree of control with which to create a spatial mapping of the electromagnetic properties of the object. Note that in order to modulate or mask the sensing field, the electrodes in the modulation layer only need to be connected to electrical ground and do not need to carry a radio-frequency signal. Therefore, this embodiment makes it possible to scan the sensing array using simple low-cost electronic switching components.

Finally, in a further embodiment of the present invention, the modulation layer mentioned previously can also be employed to convey digital information to an electronic device that is proximal to the sensing array. It is noted that the operation of the modulation layer to mask or unmask portions of the array inherently produces a two-state amplitude modulation of the sensing field (corresponding to switch open or switch closed). Any electronic device tuned to the particular frequency of the array, such as 13.56 MHz, can readily detect and monitor these amplitude modulations. Thus, by modulating the sensing field in a recognizable time-sequence, the sensing array can convey digital information to the proximal electronic device.

BRIEF DESCRIPTION OF THE DRAWINGS

Features and advantages of the present invention will become apparent to those skilled in the art from the description below, with reference to the following drawing figures, in which:

FIG. 5A is a schematic block diagram of an embodiment of the present invention incorporating multiple capacitively-coupled sensor elements and employing a multiplexer switch and a separate oscillator for each sensor;

FIG. 6A is a schematic block diagram of an embodiment of the present invention incorporating multiple inductively-coupled sensor elements and employing a multiplexer switch and separate oscillator for each sensor;

DESCRIPTION OF ILLUSTRATED EMBODIMENTS

Figure 1A:
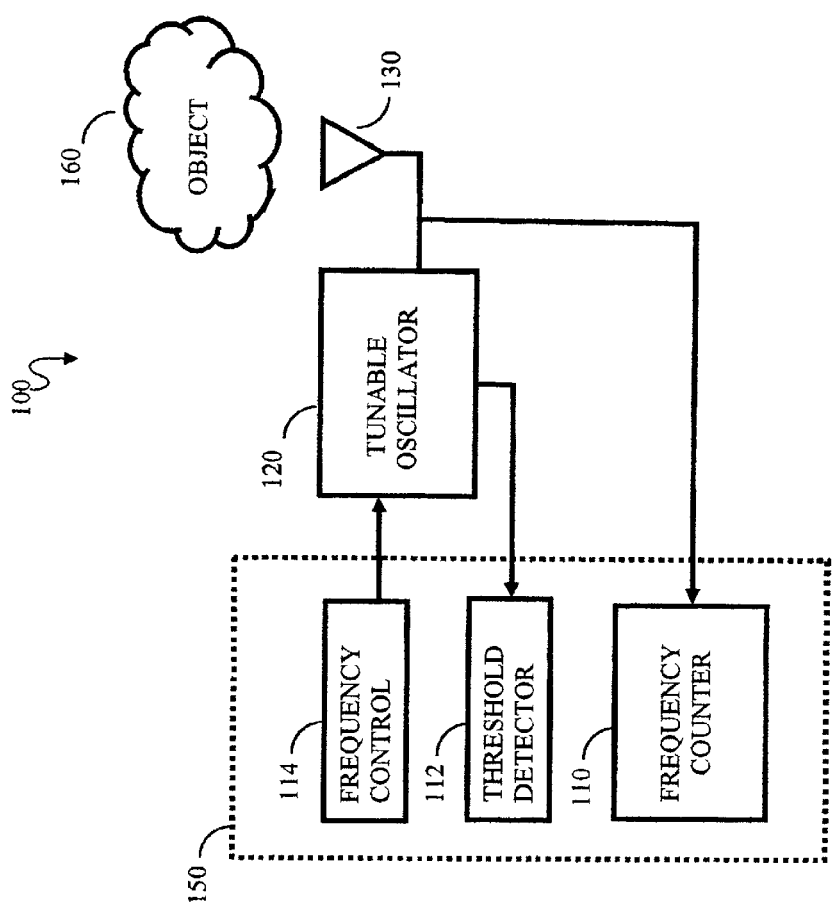
FIG. 1A is a function block diagram of the basic elements of the object sensing and tracking system.

In FIG. 1A, the basic operation of the electronic object sensing and tracking system 100 is illustrated with a general functional diagram. A fundamental feature of the present invention is the generation of an oscillating electromagnetic signal targeted at objects or potential objects via one or more antenna structures or "sensing elements" 130, each having a characteristic resonant frequency. External objects in proximity to each sensing element 130 produce a change in the characteristic frequency in accordance to their electromagnetic material properties. Measured changes in the characteristic frequency of one or more sensing elements are then used to determine the presence, identity, and movement of the objects in relation to a predefined surface or surfaces.

Measurement of the characteristic resonant frequencies are accomplished through the use of a comparator or threshold detector 112 that monitors the amplitude or power level of oscillator 120. As the probing frequency is varied, the change in signal amplitude at resonance triggers the threshold detector 112, which in turn initiates the frequency counter reading. The frequency counter 110 is also implemented internally using a microcontroller IC chip 150 and thus enables the relevant frequency shifts to be measured accurately and inexpensively with minimal external components.

The oscillator 120 in FIG. 1A can be implemented using a number of different electronic circuit topologies known in the art, ranging from single-chip solutions to discrete-component oscillator circuits. Relevant types of electronically-tunable oscillators include, but are not limited to: op-amp oscillators, discrete-component LC oscillators, single-chip VCOs (Voltage-controlled oscillators), Phase-Locked Loop (PLL) synthesizers, and Direct Digital Synthesis (DDS) ICs. Most relevant for low-cost implementations are single-chip or discrete component Voltage Controlled Oscillators (VCO) that can be tuned electronically using a control voltage. This control voltage can also be implemented very inexpensively with a low-cost microcontroller, either by low-pass filtering a Pulse Width Modulated (PWM) output or by incremental charging and discharging of an external capacitor using a sequence of digital pulses.

Figure 1C:
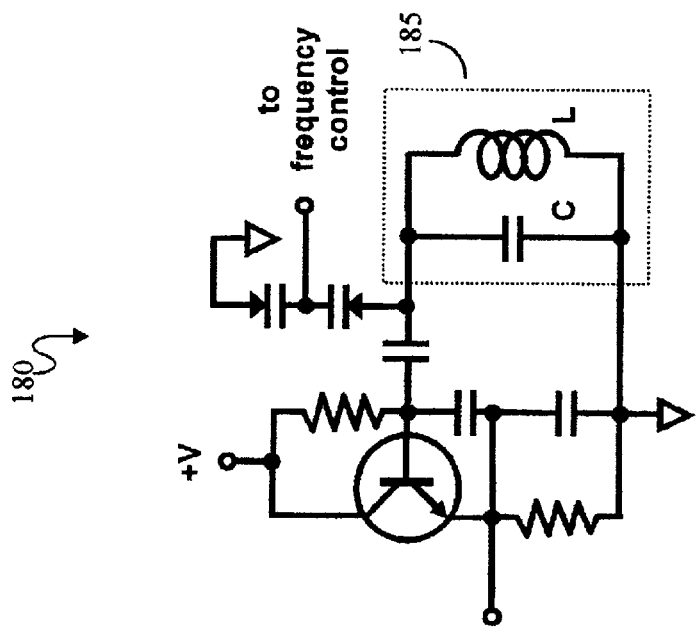
FIG. 1C shows an alternate oscillator circuit that can be used as the oscillator component of the present invention.
Figure 1B:
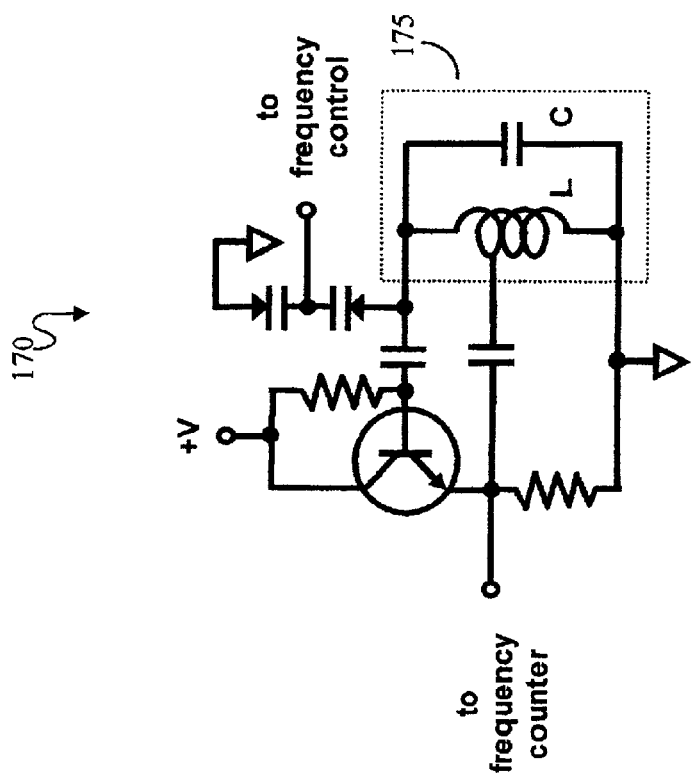
FIG. 1B shows a sample oscillator circuit that can be used as the oscillator component of the present invention.

In the low-frequency range (less than 1 MHz), op-amp based VCOs or single chip CMOS VCOs (such as the CMOS 555) are most cost effective; but at higher frequencies, discrete-component VCO's are generally most appropriate. FIG. 1B and FIG. 1C illustrate the two single-transistor circuit topologies most relevant for low-cost implementation: the emitter-coupled version of the Colpitts oscillator 170 with inductive feedback (FIG. 1B); and the emitter-coupled version of the Hartley oscillator 180 with capacitive feedback (FIG. 1C). In both cases, the characteristic frequency (in Hz) of each circuit is approximately given by $$f = \frac{1}{2\pi\sqrt{LC}}$$

as determined by resonators 175 and 185 and modulated by the additional tuning capacitance of the varactor diodes. Equivalent circuits employing FETs (Field Effect Transistors) instead of BJTs (Bipolar Junction Transistors) can also be used and are preferred for low-power applications.

As a system for sensing and tracking objects, the present invention can be implemented using a wide variety of oscillator types, including those mentioned previously. In the simplest implementations, such as in the case of a discrete-component Hartley or Colpitts oscillator, the resonant sensing element is an integral part of the oscillator circuit itself, and in this case it is difficult to define a sensing element separately from the oscillator. However, for the purpose of clarity and generality, it is most useful to describe the present invention in terms of an oscillator and one or more "sensing elements", comprised of an inductor-capacitor network (typically planar electrode and coils). In the remaining figures and ensuing descriptions, the various embodiments of the present invention are thus illustrated as an oscillator, a frequency counter, and an external inductor-capacitor network.

Figure 2A:
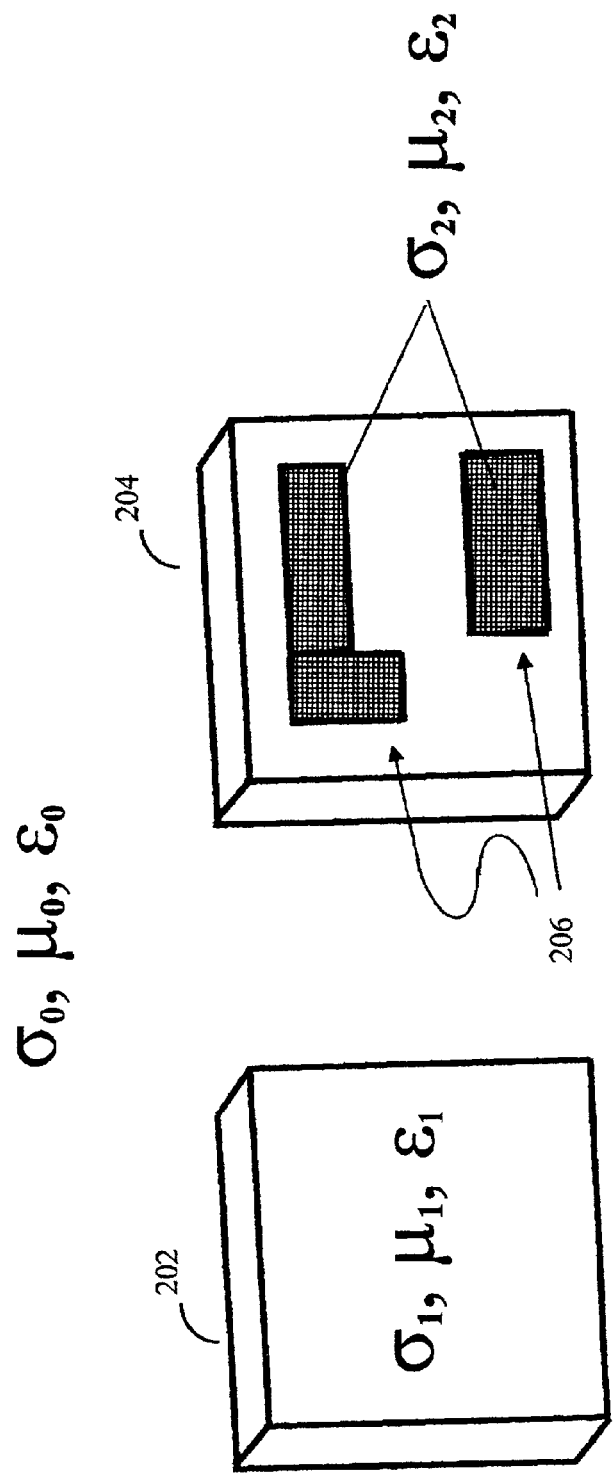
FIG. 2A illustrates the electromagnetic properties of objects with and without electromagnetic markers, in accordance with alternative embodiments of the present invention.

FIG. 2A explains the properties of the object(s) being sensed by the present invention. The changes in the characteristic frequency are a function of object's material characteristics: electrical conductivity ($\sigma_1$), dielectric permittivity ($\in_1$) and magnetic permeability ($\mu_1$). In order to be detected, at least one of these properties must be significantly different from that of the surrounding medium (usually air) with electromagnetic properties $\sigma_0$, $\in_0$, and $\mu_0$. In general, the electrical conductivity produces a positive frequency shift, while dielectric materials and magnetically permeable materials produce a negative frequency shift. The magnitude of the frequency shift is determined by the distance between the object and the sensing elements, but in practice, the objects are placed at a fixed distance from the sensing elements, (for example, resting on the sensing surface), which gives reproducible and recognizable signals based on the material properties.

In a further aspect of the present invention, the detection of the objects can be enhanced through the use of electromagnetic markers 206. In the preferred embodiment, the markers are comprised of materials having easily distinguishable electromagnetic properties $\sigma_2$, $\in_2$, and $\mu_2$, and may be in the form of a attached label, printed coating, or embedded regions of material. Since the present invention does not require line-of-sight optical access to the markers, the markers may also be embedded under the surface or into the object for aesthetic purposes. FIG. 2A shows an unmarked object 202 as well as a marked object 204.

Figure 2B:
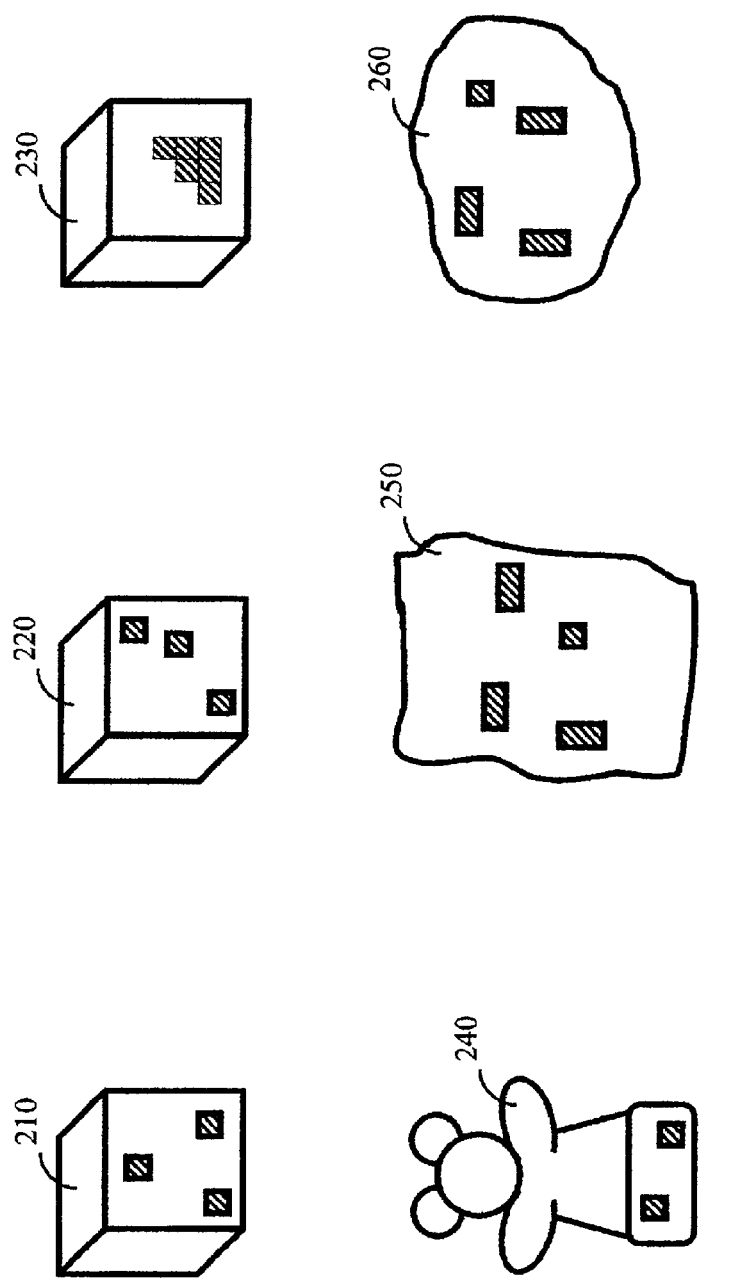
FIG. 2B is an example of the electromagnetic marker patterns for objects to be sensed and tracked by the present invention.

FIG. 2B illustrates how the spatial pattern of the electromagnetic markings can be used as a means of uniquely identifying the objects. By employing an array of sensing elements, the objects may be distinguished by properly chosen unique marker patterns and the resulting electromagnetic field distortions produced. FIG. 2B shows several examples of marker patterns used with a small sample of different object types (210, 220, 230, 240, 250 and 260) which can be monitored by the present invention.

The radio-frequency electromagnetic field generated by the sensing elements can be coupled to the external objects in two ways, capacitive coupling and inductive coupling, as determined by the geometry of the sensing elements. Although alternating electromagnetic fields necessarily contain both electric and magnetic field components, planar electrode patches contain locally uniform regions of electric field that enhances capacitive coupling and is suited for probing an object's dielectric properties. Conversely, the locally uniform magnetic field produced by coil geometries is best suited for inductive coupling and probing an object's magnetic properties.

Figure 3A:
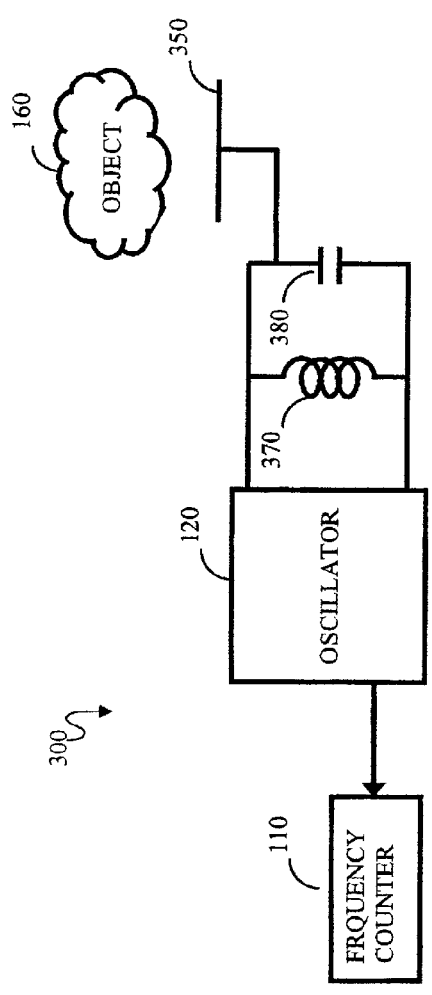
FIG. 3A is a schematic block diagram of a sensor element of the present invention employing direct connection to the oscillator and capacitive coupling to the object.
Figure 3B:
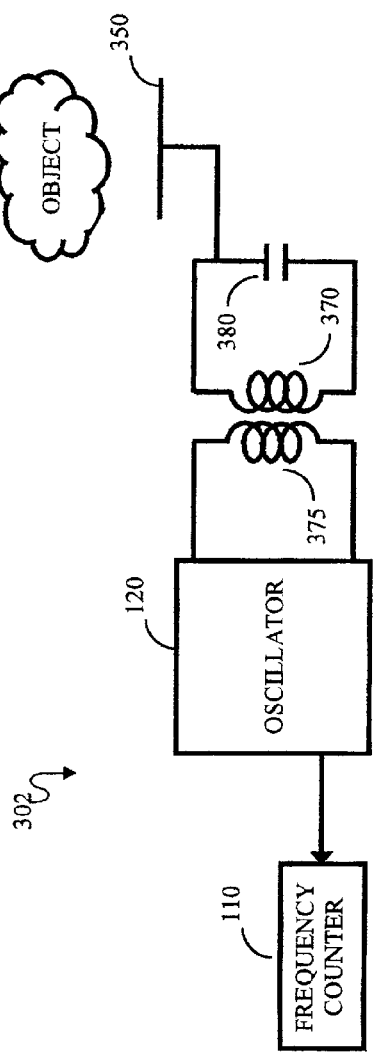
FIG. 3B is a schematic block diagram of a sensor element of the present invention employing an inductively-coupled connection to the oscillator and capacitive coupling to the object.

FIG. 3A and FIG. 3B illustrate capacitively-coupled versions 300, 302 of the object sensing and tracking system, for capacitively coupling the electromagnetic field to the object 160. The system 300 includes the aforementioned frequency counter 110 and oscillator component 120. The figures also illustrate the resonator portion of oscillator 120, shown here more explicitly as elements 370 and 380, respectively, along with capacitively-coupled antenna element 250. FIG. 3A illustrates direct coupling between the oscillator and resonator elements. FIG. 3B illustrates inductive coupling between the oscillator and resonator elements, which eliminates the need for a physical connection between the oscillator and resonator elements.

Figure 4A:
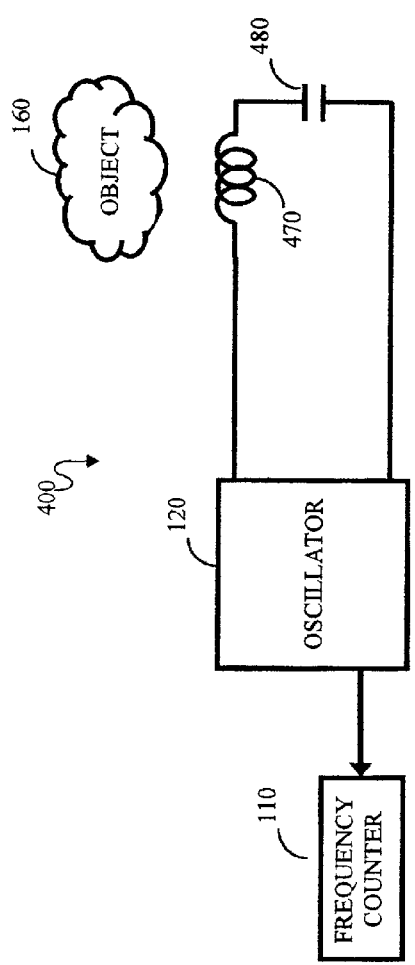
FIG. 4A is a schematic block diagram of a sensor element of the present invention employing direct connection to the oscillator and inductive coupling to the object.
Figure 4B:
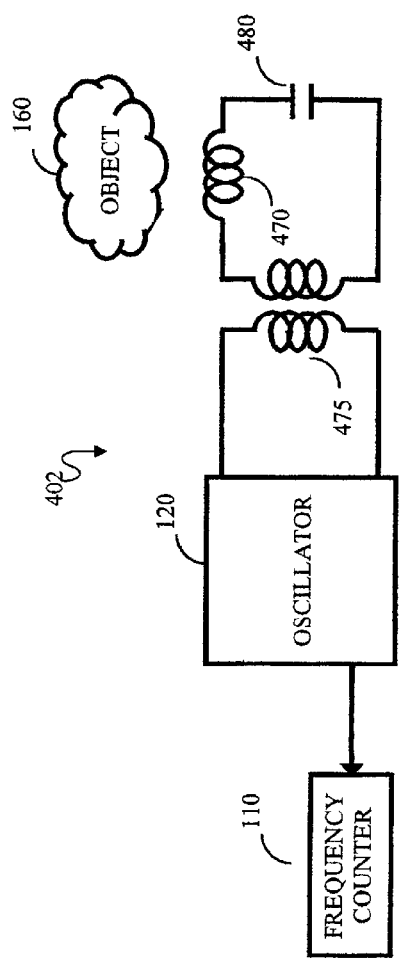
FIG. 4B is a schematic block diagram of a sensor element of the present invention employing an inductively-coupled connection to the oscillator and inductive coupling to the object.

The systems 400, 402 in FIG. 4A and FIG. 4B are similar to the systems 300, 302 in FIG. 3A and FIG. 3B, except that inductive coupling to the object 160 is employed (via element 470) as the primary sensing means.

A method for connecting a single frequency counter (and its associated electronics) to a plurality of sensor elements is illustrated in FIG. 5A. A plurality of capacitively-coupled sensing elements (582, 584, 586) are selectively activated to detect and monitor an object. Each sensing element is connected to a dedicated oscillator (522, 524, 526). A switch (or multiplexer) 515 under the direction of the microcontroller (not shown) determines which sensor element (or elements) is active and enables the sensing array to be serially scanned.

FIG. 6A depicts an alternate embodiment (600) of the present invention, in which the capacitive sensor elements are replaced by inductive sensor elements (represented by the numbers 672, 674 and 676) for inductive coupling to the object. Elements 615, 622, 624 and 626 are analogous to the following FIG. 5A elements, respectively: 515, 522, 524 and 526.

Figure 5B:
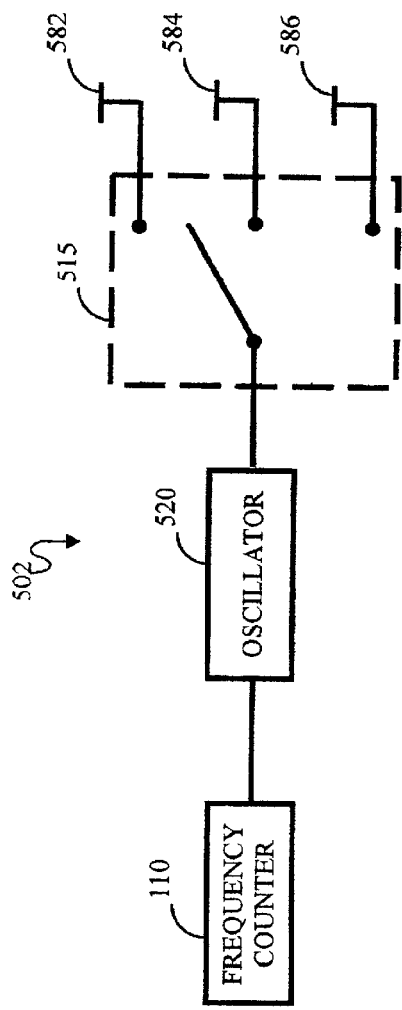
FIG. 5B is a schematic block diagram of an embodiment of the present invention incorporating multiple capacitively-coupled sensor elements multiplexed to a single oscillator and frequency counter.
Figure 6B:
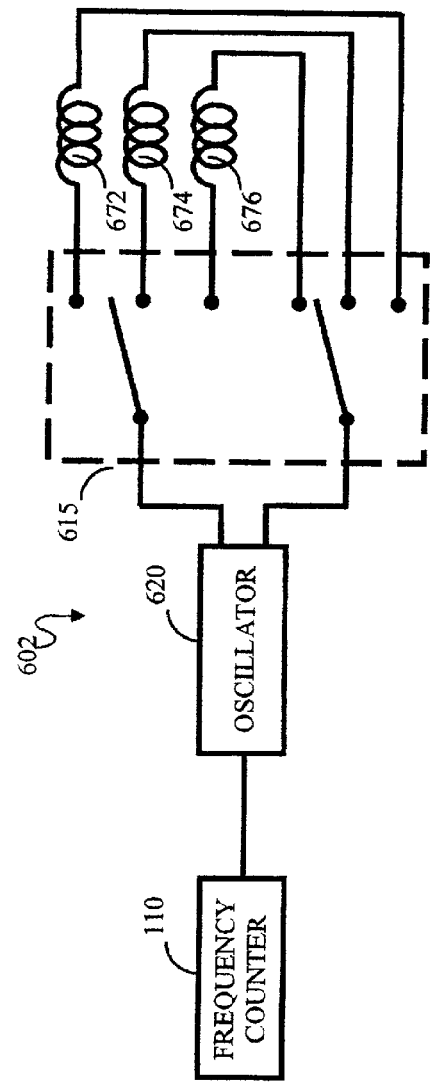
FIG. 6B is a schematic block diagram of an embodiment of the present invention incorporating multiple inductively-coupled sensor elements multiplexed to a single oscillator and frequency counter.

Alternative methods for implementing an array of sensing elements is shown in FIG. 5B and FIG. 6B. The functions of the circuits in FIGS. 5B and 6B are identical to the functions of the circuits of FIGS. 5A and 6A, respectively. However, rather than having several dedicated oscillators, the circuits in FIGS. 5B and 6B contain only a single oscillator that is multiplexed to each of the sensor elements in the array. All of the system components in FIGS. 5B and 6B are analogous to their counterparts in FIGS. 5A and 6A.

Figure 7:
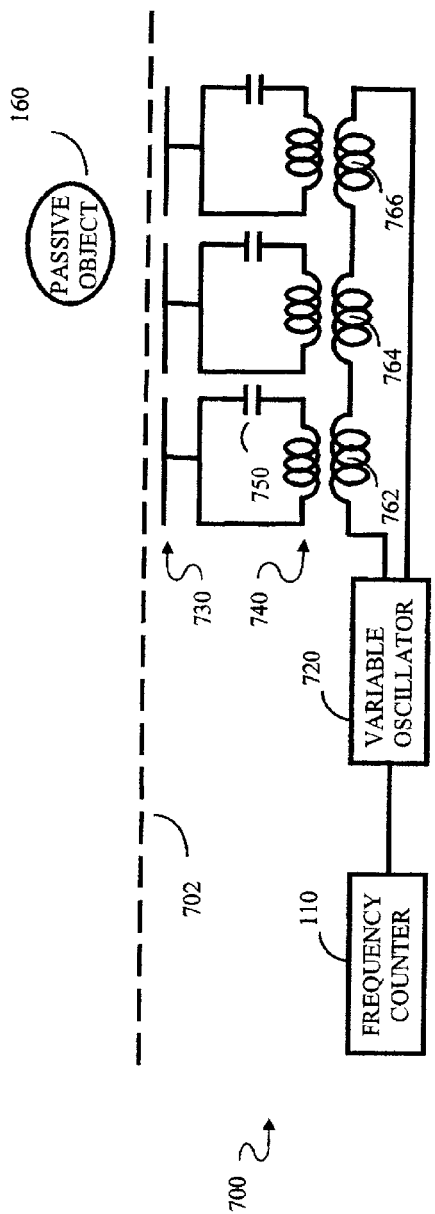
FIG. 7 is a schematic block diagram of a preferred embodiment of the present invention incorporating multiple capacitively-coupled sensor elements inductively-coupled to a single oscillator.
Figure 8:
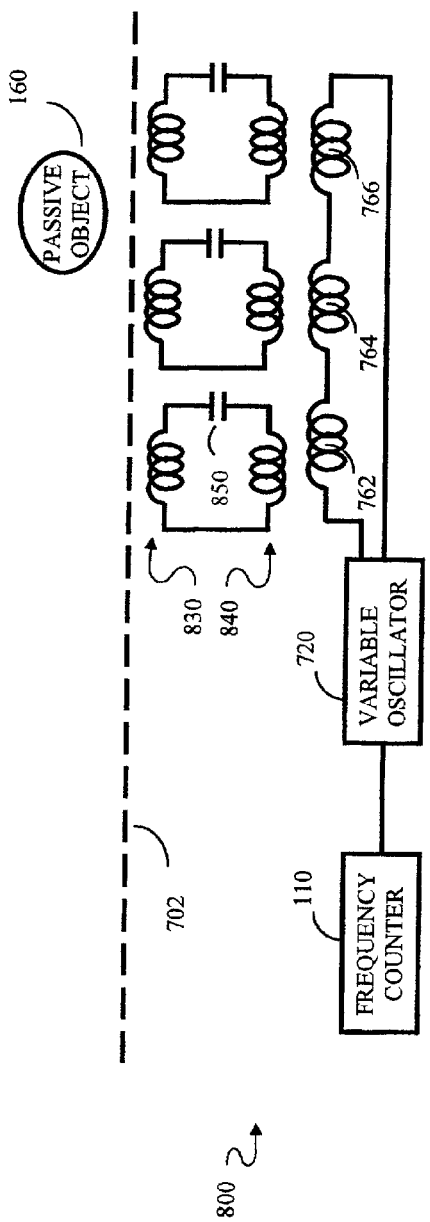
FIG. 8 is a schematic block diagram of a preferred embodiment of the present invention incorporating multiple inductively-coupled sensor elements inductively-coupled to a single oscillator.

A preferred method for implementing a plurality of sensing elements is illustrated in FIG. 7 and FIG. 8. In this embodiment, the individual sensor elements in the array are inductively coupled to the oscillator 720 via a single coil (depicted as 762, 764, and 766). This embodiment greatly reduces the amount of wiring and circuitry needed to implement multiple sensing elements using a single oscillator and frequency counter. By using sensor elements with distinct resonant frequencies, each element can be individually monitored and distinguished. In order to prevent possible a overlap in the resonant frequencies between several sensor elements during operation, the resonant frequencies of the sensor elements are selected to be at frequency intervals larger than the frequency shift (typically 10 KHz–100 KHz) caused by the interaction with the external object 160 over surface 702. A frequency spacing of 500 KHz–2000 KHz for the sensor elements is adequate for most applications.

Figure 9:
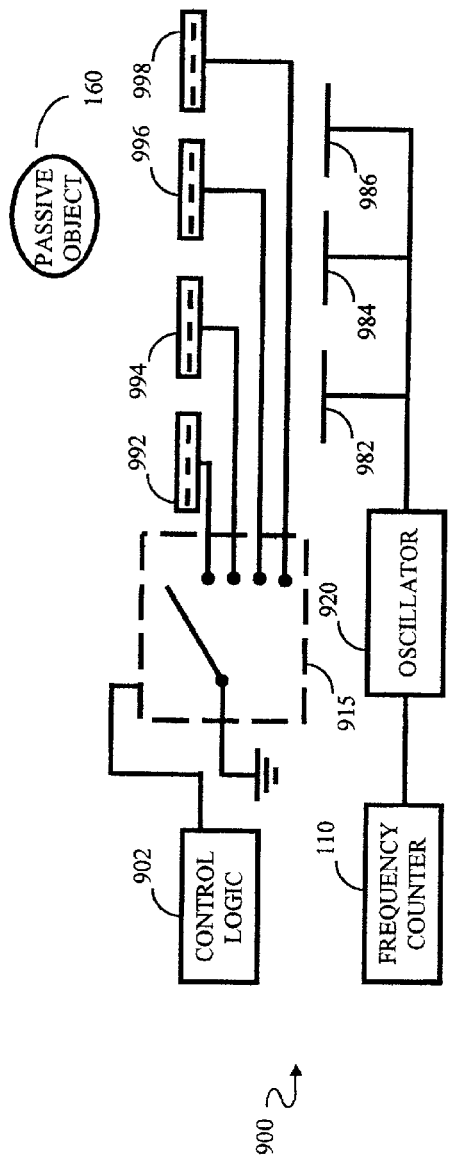
FIG. 9 is a schematic block diagram of an alternative embodiment of the present invention incorporating multiple capacitively-coupled sensor elements and employing shielding electrodes for masking selected sensing elements.
Figure 10:
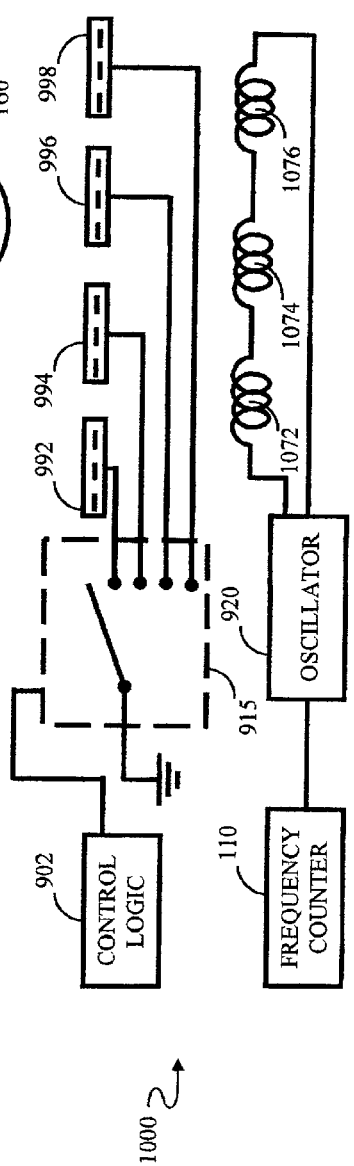
FIG. 10 is a schematic block diagram of an alternative embodiment of the present invention incorporating multiple inductively-coupled sensor elements and employing shielding electrodes for masking selected sensing elements.

Another embodiment of the present invention is illustrated in FIGS. 9 and 10. As an alternative to having individual spatially-resolved sensing elements, these embodiments employ a layer of shield or guard electrodes (992, 994, 996, and 998) as modulators for selectively enabling or disabling ("masking") portions of the sensing field. When a given shield electrode is electrically connected to ground, it then functions as an electrical shield that attenuates and effectively disables the portion of the sensing field corresponding to one or more of the sensor electrodes immediately below it. Careful control of masking by the microprocessor enables the system to have an additional degree of control for creating a spatial mapping of the electromagnetic properties of the object. Compared to other embodiments of the present invention, this embodiment is particularly useful for implementing a closely-packed sensing array with high spatial resolution, where there is insufficient surface area to implement individual resonator elements (as in FIGS. 7 and 8).

FIG. 9 illustrates three capacitively-coupled sensor elements 982, 984, and 986 connected to oscillator 920 and a frequency counter 110 for measuring characteristic frequency changes. The sensor elements 982, 984, and 986 are selectively masked by the shielding electrodes 992, 994, 996, and 998 under the control of a control logic circuit 902 (a subset of the microprocessor or microcontroller) and a switch or multiplexer 915. FIG. 10 illustrates a similar system but employing inductive coupling to the external object via coil portions 1072, 1074, and 1076.

Figure 11:
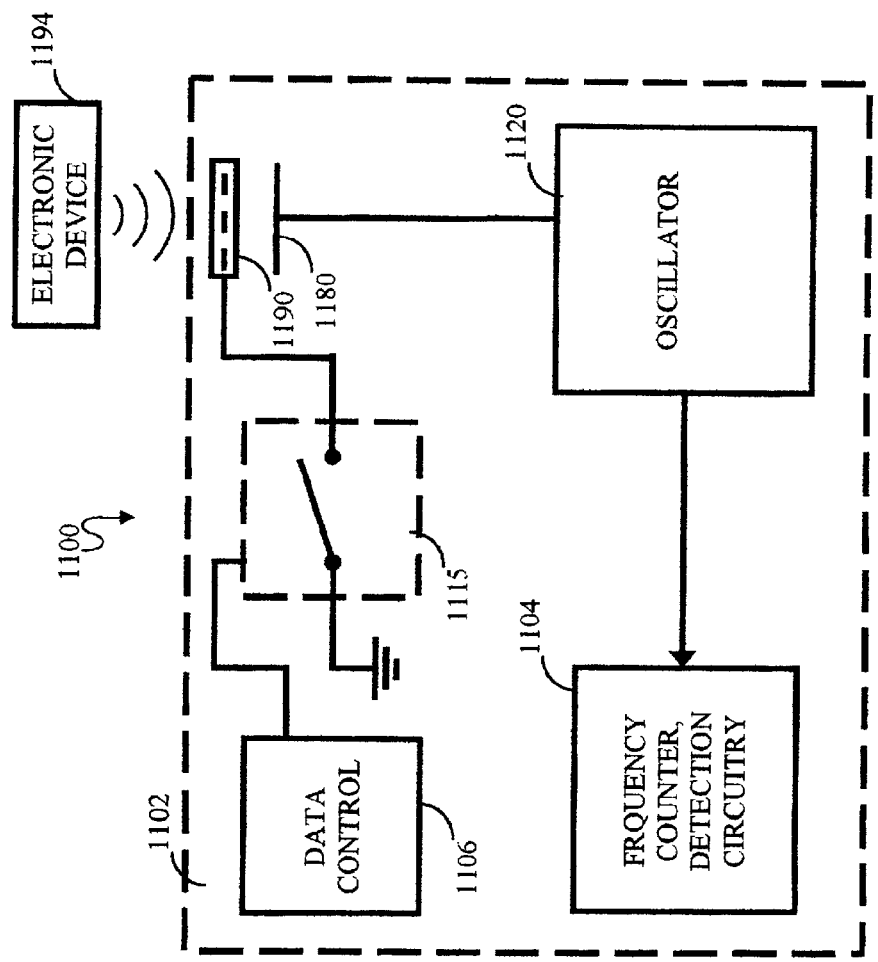
FIG. 11 is a schematic block diagram of an embodiment of the present invention employing shielding electrodes and electromagnetic field modulation to communicate with external electronic devices.

In a further alternate embodiment (1100) of the present invention shown in FIG. 11, it is illustrated how the same masking electrodes and field modulation described above can be used to communicate information to an external device or appliance. In particular, the electromagnetic sensing field is modulated in a data pattern to communicate information to external wireless electronic devices (e.g., handheld PCs, PDAs, personal communication devices, RFID tag readers, cellular telephones, and hand-held data input devices). Along with an oscillator 1120, an antenna element 1180, and counter/detection circuitry 1104, the circuit 1102 also contains data control 1106 responsible for controlling a switch 1115 and a shielding electrode 1190. The data control 1106 causes the switch to modulate the electromagnetic field according to the appropriate data pattern that can be received by the external wireless communication device. The data control 1106 and switch 1115 can be electronically identical to control logic 902 and switch 915 shown in FIGS. 9 and 10, but have been renamed in FIG. 11 simply to emphasize their alternate functionality.

Figure 12B:
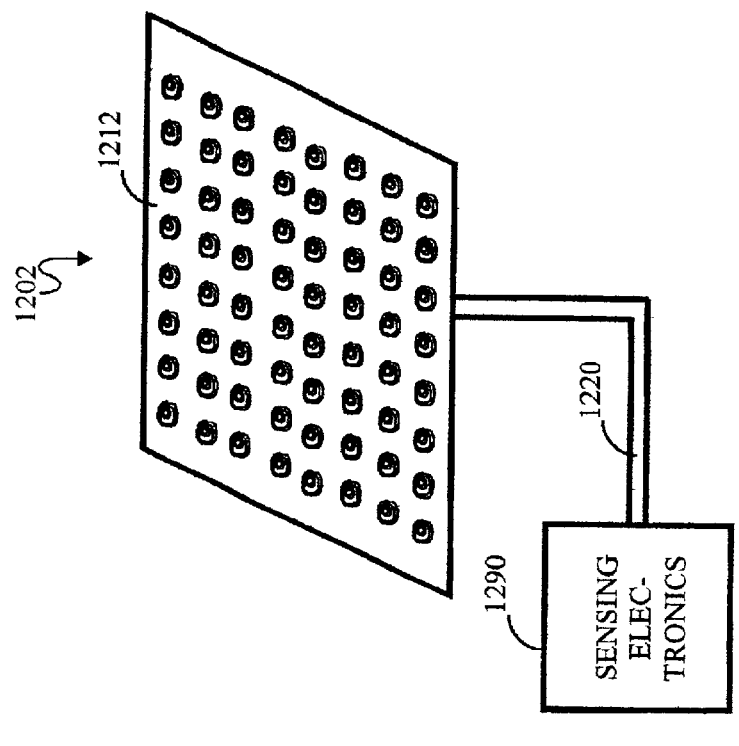
FIG. 12B is a version of the object sensing and tracking system using a large array containing many inductive sensor elements.
Figure 12A:
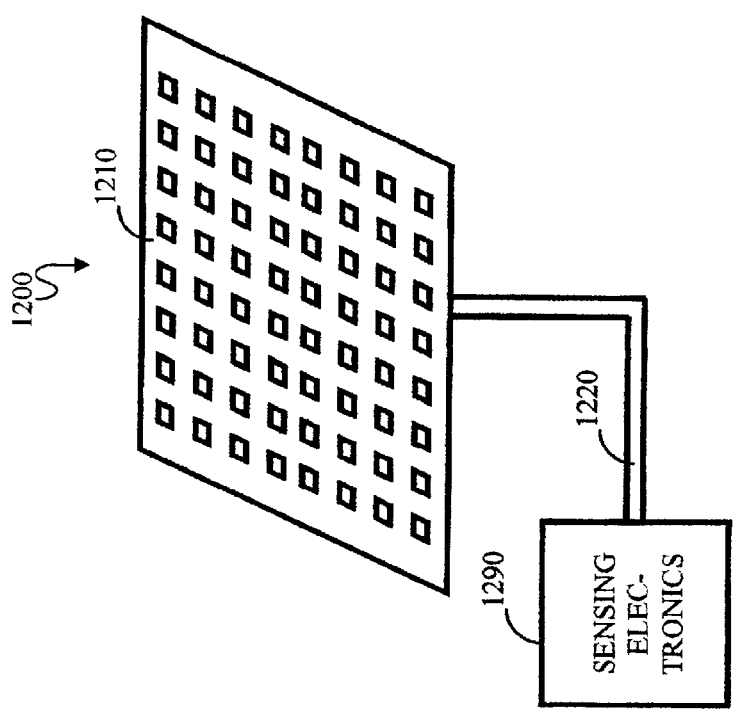
FIG. 12A is a version of the object sensing and tracking system using a large array containing many capacitive sensor elements.
Figure 13:
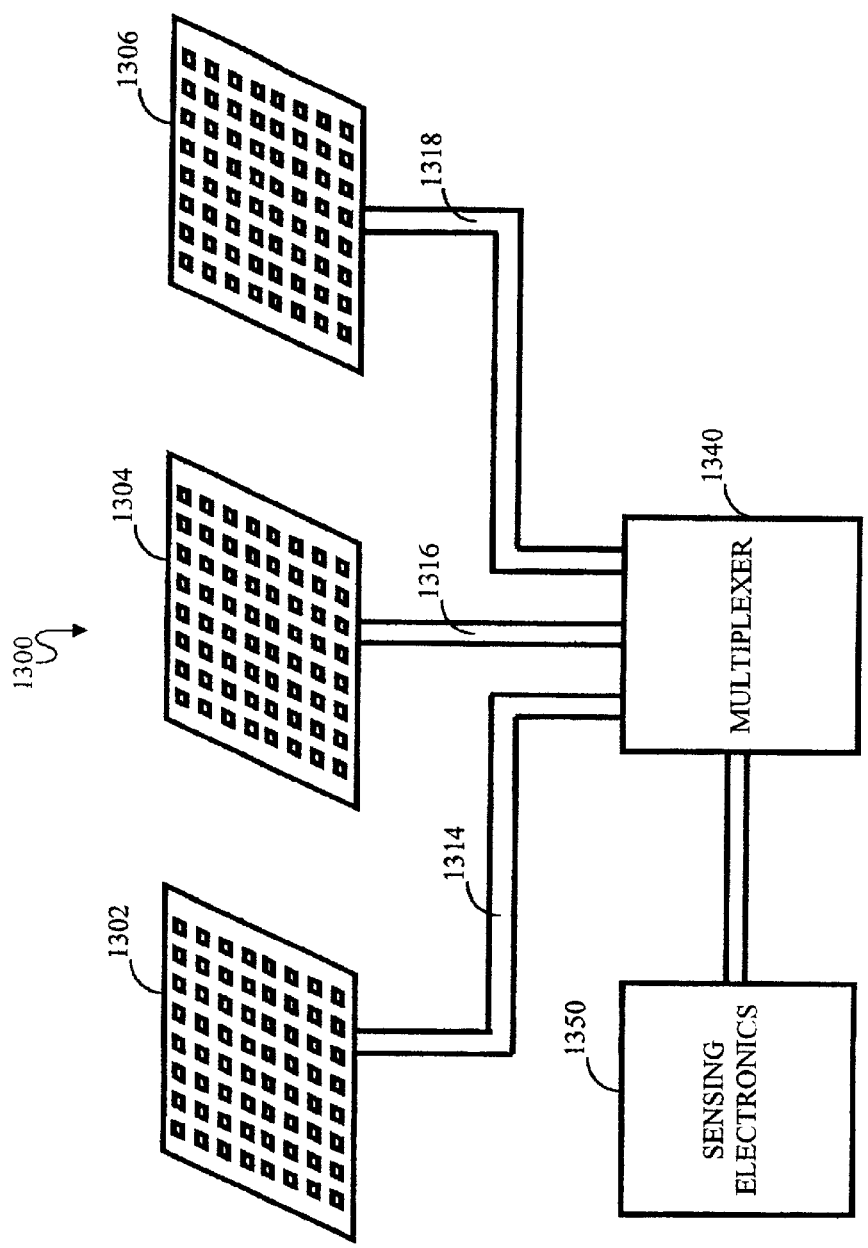
FIG. 13 is a version of the object sensing and tracking system showing how several arrays can be multiplexed together to create multiple sensing zones.

For extending the capabilities of the present invention to larger surface areas, it is possible and often desirable to combine several smaller sensing arrays into a larger system. Capacitively-coupled arrays (FIG. 12A) and inductively-coupled arrays (FIG. 12B) can thus be treated as "sub-arrays" and multiplexed together to form a contiguous sensing zone, as shown in system 1300 of FIG. 13 in accordance to an alternative embodiment of the present invention. Along with sensing electronics 1350, the embodiment 1300 also contains several sub-arrays (represented by the numbers 1302, 1304, and 1306) connected by signal buses 1314, 1316 and 1318, and a multiplexer 1340.

Figure 14:
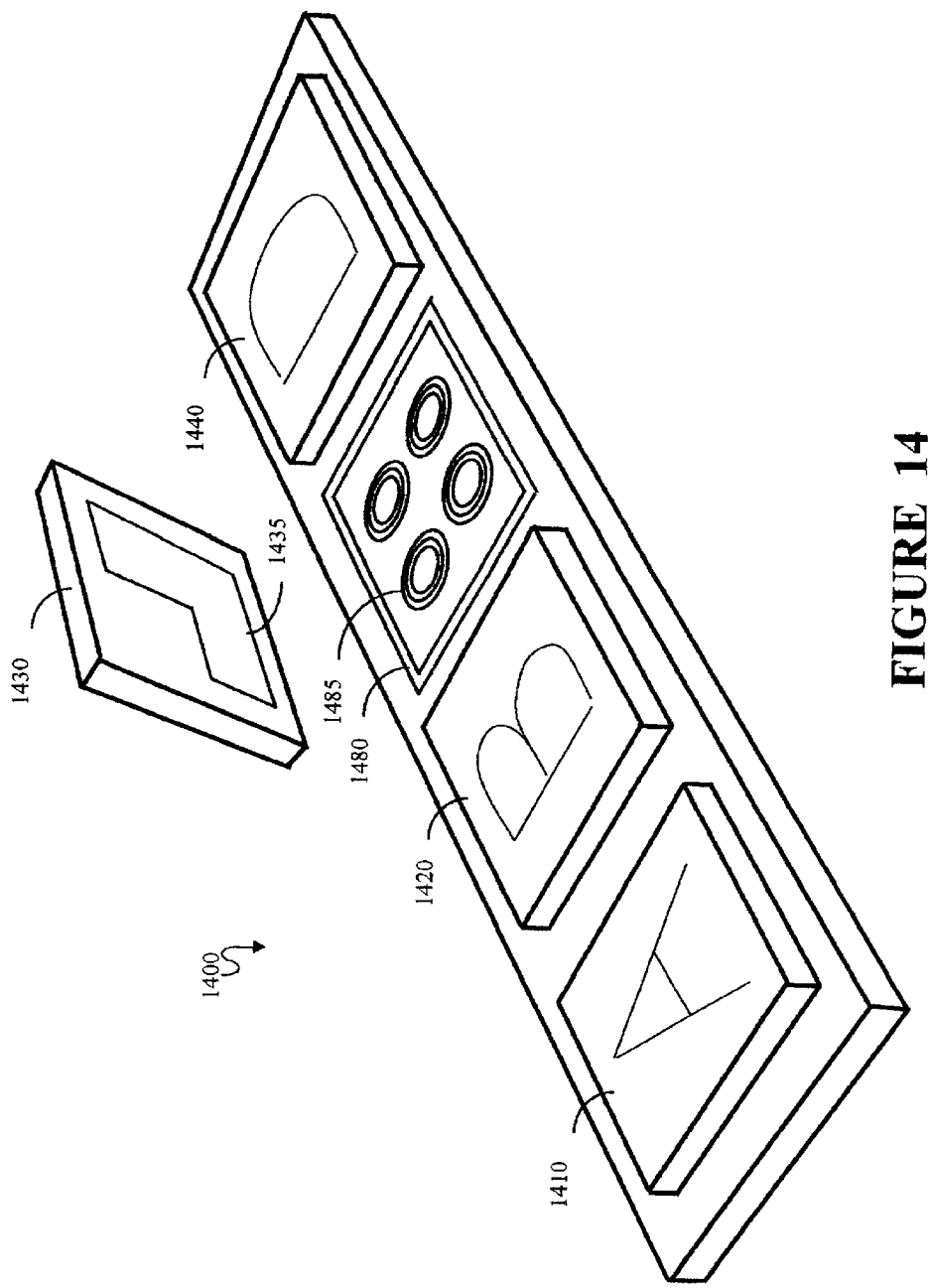
FIG. 14 illustrates a sample embodiment of the present invention applied to a children's toy for identifying alphabet tiles.

FIG. 14 illustrates an application of the present invention to a children's letter toy consisting of four sensing zones that can electronically identify letter tiles (e.g. 1410, 1420, 1430, 1440). Each sensing zone consists of a small sub-array of resonant elements 1485 that are inductively-coupled to the oscillator via coil 1480. An inexpensive electronic marker 1435 in the form of a metal foil label or printed conducting ink pattern is affixed to each letter tile in a unique geometric pattern designed to overlap or partially overlap one or more sensing elements. Placement of a letter tile on any one of the sensing zones causes a shift in one or more resonant frequencies of the sensor elements 1485, thus enabling the letter tile to be uniquely identified. By increasing the number of resonant elements in each sub-array, a larger number of electronic marker patterns can be distinguished. This additional information can be employed to measure 2D orientation as well as to recognize a larger number of tiles.

Figure 15:
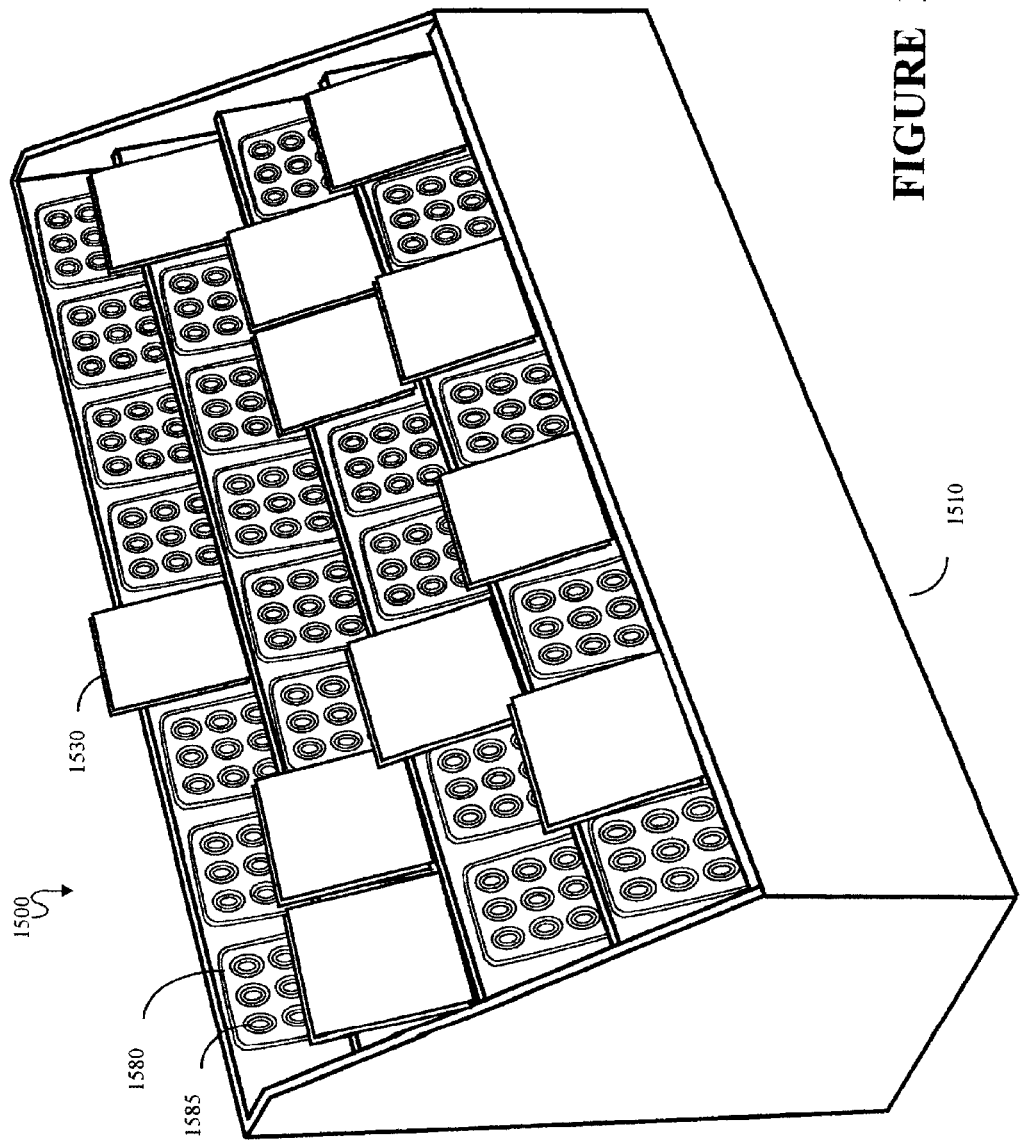
FIG. 15 illustrates a sample embodiment of the present invention applied to a retail store shelf for sensing and tracking objects for the purpose of real-time inventory and security.

FIG. 15 illustrates an embodiment of the present invention applied to retail inventory-monitoring and security. A display fixture 1510 designed to hold music CDs 1530 (or equivalently, greeting cards, DVD's, books or magazines) is shown in FIG. 15 having multiple sensing zones (sub-arrays) 1580 tailored to the specific shelf size and spacing for holding the music CDs. Electronic markers (e.g. foil labels, electrically conductive ink, magnetically-permeable ink) affixed or printed to the music CD cases enable a basic level of identification (on the order of 10–20 bits of information). Most importantly, however, the present invention enables the system to electronically monitor the presence and movement of the products on display. This, in turn, can enable a wide variety of applications such as automatic re-ordering for product shelves that are empty and tracking activity on the shelf level for security applications and integration with a automated store surveillance cameras.

While this invention has been described in terms of several embodiments and specific examples, there are alterations, permutations, and equivalents which fall within the scope of this invention and protection granted by this Letters Patent. It is therefore intended that the following appended claims be interpreted as including all such alterations, permutations, and equivalents as fall within the true spirit of the present invention.

What is claimed is:

1. A method of probing an object, the method comprising:
   forming a reference structure comprising near-field antenna sensing elements, each sensing element having one or more characteristic frequencies of oscillation;
   generating an electromagnetic field near the sensing elements;
   coupling electromagnetically at least one sensing element to the object via the electromagnetic field; and
   measuring changes in the characteristic frequencies that are caused by the coupling.

2. The method of claim 1 further comprising:
   determining physical parameters of the object from the measured changes in the characteristic frequencies.

3. The method of claim 1 further comprising:
   determining the presence of the object from the measured changes in the characteristic frequencies.

4. The method of claim 1 further comprising:
   determining the identity of the object from the measured changes in the characteristic frequencies.

5. The method of claim 1 further comprising:
   determining the position of the object from the measured changes in the characteristic frequencies.

6. The method of claim 1 further comprising:
   determining the orientation of the object from the measured changes in the characteristic frequencies.

7. The method of claim 1 wherein measuring changes comprises using a frequency counter.

8. The method of claim 1 wherein the electromagnetic coupling is capacitive.

9. The method of claim 1 wherein the electromagnetic coupling is inductive.

10. The method of claim 8, further comprising:
    coupling an oscillator to each sensing element;
    coupling a multiplexer to the oscillators; and
    selecting, by the multiplexer, a combination of an oscillator and a sensing element for generating the electromagnetic field.

11. The method of claim 9, further comprising:
    coupling an oscillator to each sensing element;
    coupling a multiplexer to the oscillators; and
    selecting, by the multiplexer, a combination of an oscillator and a sensing element for generating the electromagnetic field.

12. The method of claim 8, further comprising:
    generating the electromagnetic field using an oscillator;
    coupling a multiplexer to the oscillator and to the sensing elements; and
    selecting, by the multiplexer, a sensing element for generating the electromagnetic field.

13. The method of claim 9, further comprising:
    generating the electromagnetic field using an oscillator;
    coupling a multiplexer to the oscillator and to the sensing elements; and
    selecting, by the multiplexer, a sensing element for generating the electromagnetic field.

14. The method of claim 8, further comprising:
    selecting sensing elements for masking; and
    selectively masking the selected sensing elements so that only the unmasked elements couple to the object.

15. The method of claim 9, further comprising:
    selecting sensing elements for masking; and
    selectively masking the selected sensing elements so that only the unmasked elements couple to the object.

16. A method of claim 1, further comprising:
coupling a multiplexer to an oscillator and to the antenna elements;
selecting, by the multiplexer, a plurality of antenna elements; and
generating an electromagnetic field using the oscillator and the selected antenna elements, the electromagnetic field being modulated to convey information to the object.

17. A method of claim 8, further comprising:
coupling a multiplexer to an oscillator and to the antenna elements;
selecting, by the multiplexer, a plurality of antenna elements; and
generating an electromagnetic field using the oscillator and the selected antenna elements, the electromagnetic field being modulated to convey information to the object.

18. A method of claim 9, further comprising:
coupling a multiplexer to an oscillator and to the antenna elements;
selecting, by the multiplexer, a plurality of antenna elements; and
generating an electromagnetic field using the oscillator and the selected antenna elements, the electromagnetic field being modulated to convey information to the object.

19. The method of claim 1, further comprising:
coupling at least one marker with the object, the at least one marker having electromagnetic properties substantially different from the electromagnetic properties of the object, the electromagnetic properties of the at least one marker causing the changes in the characteristic frequencies, the spatial arrangement of the at least one marker enhancing the probing of the object.

20. The method in claim 8, further comprising:
coupling at least one marker with the object, the at least one marker having electromagnetic properties substantially different from the electromagnetic properties of the object, the electromagnetic properties of the at least one marker causing the changes in the characteristic frequencies, the spatial arrangement of the at least one marker enhancing the probing of the object.

21. The method in claim 9, further comprising:
coupling at least one marker with the object, the at least one marker having electromagnetic properties substantially different from the electromagnetic properties of the object, the electromagnetic properties of the at least one marker causing the changes in the characteristic frequencies, the spatial arrangement of the at least one marker enhancing the probing of the object.

22. The method of claim 1, further comprising:
coupling at least one marker with the object, the at least one marker comprised of electrically conductive elements, the electromagnetic properties of the at least one marker causing the changes in the characteristic frequencies, the spatial arrangement of the at least one marker enhancing the probing of the object.

23. The method in claim 8, further comprising:
coupling at least one marker with the object, the at least one marker comprised of electrically conductive elements, the electromagnetic properties of the at least one marker causing the changes in the characteristic frequencies, the spatial arrangement of the at least one marker enhancing the probing of the object.

24. The method in claim 9, further comprising:
coupling at least one marker with the object, the at least one marker comprised of electrically conductive elements, the electromagnetic properties of the at least one marker causing the changes in the characteristic frequencies, the spatial arrangement of the at least one marker enhancing the probing of the object.

25. The method of claim 1, further comprising:
coupling at least one marker with the object, the at least one marker comprised of magnetically permeable elements, the electromagnetic properties of the at least one marker causing the changes in the characteristic frequencies, the spatial arrangement of the at least one marker enhancing the probing of the object.

26. The method of claim 8, further comprising:
coupling at least one marker with the object, the at least one marker comprised of magnetically permeable elements, the electromagnetic properties of the at least one marker causing the changes in the characteristic frequencies, the spatial arrangement of the at least one marker enhancing the probing of the object.

27. The method of claim 9, further comprising:
coupling at least one marker with the object, the at least one marker comprised of magnetically permeable elements, the electromagnetic properties of the at least one marker causing the changes in the characteristic frequencies, the spatial arrangement of the at least one marker enhancing the probing of the object.

28. The method of claim 1, further comprising:
coupling at least one marker with the object, the at least one marker having a dielectric constant substantially greater than the dielectric constant of the object, the electromagnetic properties of the at least one marker causing the changes in the characteristic frequencies, the spatial arrangement of the at least one marker enhancing the probing of the object.

29. The method of claim 8, further comprising:
coupling at least one marker with the object, the at least one marker having a dielectric constant substantially greater than the dielectric constant of the object, the electromagnetic properties of the at least one marker causing the changes in the characteristic frequencies, the spatial arrangement of the at least one marker enhancing the probing of the object.

30. The method of claim 9, further comprising:
coupling at least one marker with the object, the at least one marker having a dielectric constant substantially greater than the dielectric constant of the object, the electromagnetic properties of the at least one marker causing the changes in the characteristic frequencies, the spatial arrangement of the at least one marker enhancing the probing of the object.

31. An apparatus for probing an object, the apparatus comprising:
a reference structure having a plurality of near-field antenna sensing elements, each sensing element having one or more characteristic frequencies of oscillation;
an electromagnetic field, at least one sensing element being coupled electromagnetically to the object via the electromagnetic field; and
a measuring device measuring changes in the characteristic frequencies that are caused by the coupling.

32. The apparatus of claim 31 wherein the measuring device comprises a frequency counter.

33. The apparatus of claim 31 wherein the coupling of the electromagnetic field to the object is capacitive.

34. The apparatus of claim 31 wherein the coupling of the electromagnetic field to the object is inductive.

35. The apparatus of claim 33, further comprising:

a plurality of oscillators, each oscillator being coupled to a respective sensing element; and a multiplexer coupled to the oscillators, the multiplexer selecting a combination of an oscillator and a sensing element for generating the electromagnetic field.

36. The apparatus of claim 34, further comprising:

a plurality of oscillators, each oscillator being coupled to a respective sensing element; and a multiplexer coupled to the oscillators, the multiplexer selecting a combination of an oscillator and a sensing element for generating the electromagnetic field.

37. The apparatus of claim 33, further comprising:

an oscillator; and a multiplexer coupled to the oscillator and to the sensing elements, the multiplexer selecting a sensing element for generating the electromagnetic field using the oscillator.

38. The apparatus of claim 34, further comprising:

an oscillator; and a multiplexer coupled to the oscillator and to the sensing elements, the multiplexer selecting a sensing element for generating the electromagnetic field using the oscillator.

39. The apparatus of claim 33 wherein a plurality of the sensing elements are masked so that only the unmasked sensing elements couple to the object.

40. The apparatus of claim 34 wherein a plurality of the sensing elements are masked so that only the unmasked sensing elements couple to the object.

41. The apparatus of claim 31, further comprising:

an oscillator; and a multiplexer coupled to the oscillator and to the sensing elements, the multiplexer selecting a plurality of sensing elements, the electromagnetic field being generated using the oscillator and the selected sensing elements, the electromagnetic field being modulated to convey information to the object.

42. The apparatus of claim 33, further comprising:

an oscillator; and a multiplexer coupled to the oscillator and to the sensing elements, the multiplexer selecting a plurality of sensing elements, the electromagnetic field being generated using the oscillator and the selected sensing elements, the electromagnetic field being modulated to convey information to the object.

43. The apparatus of claim 34, further comprising:

an oscillator; and a multiplexer coupled to the oscillator and to the sensing elements, the multiplexer selecting a plurality of sensing elements, the electromagnetic field being generated using the oscillator and the selected sensing elements, the electromagnetic field being modulated to convey information to the object.

44. The apparatus of claim 31, further comprising:

at least one marker comprised of electrically conductive elements, the at least one marker coupled to the object, the electromagnetic properties of the at least one marker causing the changes in the characteristic frequencies, the spatial arrangement of the at least one marker enhancing the probing of the object.

45. The apparatus of claim 33, further comprising:

at least one marker comprised of electrically conductive elements, the at least one marker coupled to the object, the electromagnetic properties of the at least one marker causing the changes in the characteristic frequencies, the spatial arrangement of the at least one marker enhancing the probing of the object.

46. The apparatus of claim 34, further comprising:

at least one marker comprised of electrically conductive elements, the at least one marker coupled to the object, the electromagnetic properties of the at least one marker causing the changes in the characteristic frequencies, the spatial arrangement of the at least one marker enhancing the probing of the object.

47. The apparatus of claim 31, further comprising:

at least one marker having electromagnetic properties substantially different from the electromagnetic properties of the object, the at least one marker coupled to the object, the electromagnetic properties of the at least one marker causing the changes in the characteristic frequencies, the spatial arrangement of the at least one marker enhancing the probing of the object.

48. The apparatus of claim 33, further comprising:

at least one marker having electromagnetic properties substantially different from the electromagnetic properties of the object, the at least one marker coupled to the object, the electromagnetic properties of the at least one marker causing the changes in the characteristic frequencies, the spatial arrangement of the at least one marker enhancing the probing of the object.

49. The apparatus of claim 34, further comprising:

at least one marker having electromagnetic properties substantially different from the electromagnetic properties of the object, the at least one marker coupled to the object, the electromagnetic properties of the at least one marker causing the changes in the characteristic frequencies, the spatial arrangement of the at least one marker enhancing the probing of the object.

50. The apparatus in claim 31, further comprising:

at least one marker comprised of magnetically permeable elements, the at least one marker coupled to the object, the electromagnetic properties of the at least one marker causing the changes in the characteristic frequencies, the spatial arrangement of the at least one marker enhancing the probing of the object.

51. The apparatus of claim 33, further comprising:

at least one marker comprised of magnetically permeable elements, the at least one marker coupled to the object, the electromagnetic properties of the at least one marker causing the changes in the characteristic frequencies, the spatial arrangement of the at least one marker enhancing the probing of the object.

52. The apparatus of claim 34, further comprising:

at least one marker comprised of magnetically permeable elements, the at least one marker coupled to the object, the electromagnetic properties of the at least one marker causing the changes in the characteristic frequencies, the spatial arrangement of the at least one marker enhancing the probing of the object.

53. The apparatus of claim 31, further comprising:

at least one marker having a dielectric constant substantially greater than the dielectric constant of the object, the at least one marker coupled to the object, the electromagnetic properties of the at least one marker causing the changes in the characteristic frequencies, the spatial arrangement of the at least one marker enhancing the probing of the object.

54. The apparatus of claim 33, further comprising:
at least one marker having a dielectric constant substantially greater than the dielectric constant of the object, the at least one marker coupled to the object, the electromagnetic properties of the at least one marker causing the changes in the characteristic frequencies, the spatial arrangement of the at least one marker enhancing the probing of the object.

55. The apparatus of claim 34, further comprising:
at least one marker having a dielectric constant substantially greater than the dielectric constant of the object, the at least one marker coupled to the object, the electromagnetic properties of the at least one marker causing the changes in the characteristic frequencies, the spatial arrangement of the at least one marker enhancing the probing of the object.

56. An apparatus for probing an object, the apparatus comprising:
means for forming a reference structure from near-field antenna sensing elements, each sensing element having one or more characteristic frequencies of oscillation;
means for generating an electromagnetic field near the sensing elements, at least one means for sensing being coupled electromagnetically to the object via the electromagnetic field; and
means for measuring changes in the characteristic frequencies that are caused by the coupling.

57. A method of sensing a specified object with respect to a reference surface, the method comprising:
providing an array of near-field antenna elements in the form of electrode or coil structures, heretofore termed "sensing elements";
generating electromagnetic signals via DC or AC coupling to sensing elements having one or more characteristic frequencies of oscillation;
providing a means for measuring the characteristic frequencies
coupling the generated electromagnetic field to the object capacitively and/or inductively via one or more sensing elements; and
measuring changes in the characteristic frequencies that are caused by the object, wherein the measured changes in characteristic frequencies are used to determine the identity of the object having known material properties.

58. A method of sensing a specified object with respect to a reference surface, the method comprising:
providing an array of near-field antenna elements in the form of electrode or coil structures, heretofore termed "sensing elements";
generating electromagnetic signals via DC or AC coupling to sensing elements having one or more characteristic frequencies of oscillation;
providing a means for measuring the characteristic frequencies
coupling the generated electromagnetic field to the object capacitively and/or inductively via one or more sensing elements; and
measuring changes in the characteristic frequencies that are caused by the object, wherein the measured changes in characteristic frequencies are used to determine the 2-dimensional orientation of the object in the plane of the sensing surface.

59. A method of sensing a specified object with respect to a reference surface, the method comprising:
providing an array of near-field antenna elements in the form of electrode or coil structures, heretofore termed "sensing elements";
generating electromagnetic signals via DC or AC coupling to sensing elements having one or more characteristic frequencies of oscillation;
providing a means for measuring the characteristic frequencies
coupling the generated electromagnetic field to the object capacitively and/or inductively via one or more sensing elements;
measuring changes in the characteristic frequencies that are caused by the object; and
modulating transmitted electromagnetic radiation in a manner which can be used to convey information to one or more external electronic devices receptive to the electromagnetic radiation.

60. An apparatus for determining the position and orientation of a specified object with respect to a reference surface, the apparatus comprising:
a set of near-field antenna elements in the form of electrodes or coils;
a sensing array comprised of sensing elements;
at least one controlled oscillator that is DC or AC coupled to the sensing elements having one or more characteristic frequencies of oscillation;
measuring circuitry coupled to the sensing array adapted to measure changes in one or more the characteristic frequencies; and
masking elements for modulating transmitted electromagnetic radiation in a manner which can be used to convey information to one or more external electronic devices receptive to the electromagnetic radiation;
wherein the electromagnetic radiation is coupled to the object, and the changes in one or more the characteristic frequencies is used to derive position or orientation of the object.

61. An apparatus for probing an object, the apparatus comprising:
means for forming a reference structure from near-field antenna sensing elements, each sensing element having one or more characteristic frequencies of oscillation;
means for generating an electromagnetic field near the sensing elements, at least one means for sensing being coupled electromagnetically to the object via the electromagnetic field; and
means for measuring changes in the characteristic frequencies that are caused by the coupling, the measured changed used to determine the identity of the object.

62. An apparatus for probing an object, the apparatus comprising:
means for forming a reference structure from near-field antenna sensing elements, each sensing element having one or more characteristic frequencies of oscillation;
means for generating an electromagnetic field near the sensing elements, at least one means for sensing being coupled electromagnetically to the object via the electromagnetic field; and
means for measuring changes in the characteristic frequencies that are caused by the coupling, the measured changed used to determine the orientation of the object with respect to the reference structure.

63. An apparatus for probing an object, the apparatus comprising:

means for forming a reference structure from near-field antenna sensing elements, each sensing element having one or more characteristic frequencies of oscillation;

means for generating an electromagnetic field near the sensing elements, at least one means for sensing being coupled electromagnetically to the object via the electromagnetic field;

means for oscillation; and means for multiplexing coupled to means for oscillation and to the sensing elements, the means for multiplexing selecting a plurality of sensing elements, the electromagnetic field being generated using the means for oscillation and the selected sensing elements, the electromagnetic field being modulated to convey information to the object.

* * * * *